United States Patent

[11] 3,591,268

[72] Inventor Denis Manktelow Neale
Ilford, England
[21] Appl. No. 720,824
[22] Filed Apr. 12, 1968
[45] Patented July 6, 1971
[73] Assignee Columbia Broadcasting System, Inc.
New York, N.Y.
[32] Priority Apr. 17, 1967
[33] Great Britain
[31] 17540/67

[54] METHOD AND APPARATUS FOR OPTICALLY RECORDING COLOR PICTURE INFORMATION
18 Claims, 8 Drawing Figs.

[52] U.S. Cl. 352/45, 352/44, 352/66, 352/67, 95/12.2, 175/5.2 D, 175/6.7 A
[51] Int. Cl. H04n 1/46
[50] Field of Search 352/42, 43, 44, 45, 46, 66, 67, 117, 118; 95/12.2, 12.21; 178/5.2 D, 5.4 CD, 6.7 A

[56] References Cited
UNITED STATES PATENTS

| | | | |
|---|---|---|---|
| 3,475,549 | 10/1969 | Goldmark et al. | 178/5.2 |
| 3,495,518 | 2/1970 | Takagi et al. | 95/12.21 |
| 2,164,062 | 6/1939 | Grimson | 352/45 X |
| 2,953,633 | 9/1960 | Hughes | 352/45 X |
| 3,378,633 | 4/1968 | Macovski | 178/5.4 |
| 3,459,885 | 8/1969 | Goldmark et al. | 178/5.2 X |

*Primary Examiner*—John M. Horan
*Assistant Examiner*—Alan Mathews
*Attorney*—Brumbaugh, Free, Graves and Donohue

ABSTRACT: A method and apparatus for recording as a video signal color picture information for reproduction by television scanning techniques, in which a photographic film is exposed with an image of an original scene in one frame area of the film, and in another frame area with the same image as modified by a banded color filter and objective lens. The latter image passes through a cylindrically lenticular screen close to and in front of the image plane of the objective lens to form bands of colored light in a repeating pattern interrupted by unilluminated bands of one color. Exposure of the film by the banded color pattern results in a record approximating a record of a carrier signal which is modulated in amplitude and phase according to the color saturation and hue of the original scene. The unilluminated bands form on the film a record of a pilot carrier signal at one-half the frequency of the color carrier signal.

INVENTOR.
DENIS M. NEALE
BY
Brumbaugh, Free, Graves & Donohue
his ATTORNEYS

INVENTOR
DENIS M. NEALE
BY
Brumbaugh, Free, Graves & Donohue
his ATTORNEYS

METHOD AND APPARATUS FOR OPTICALLY RECORDING COLOR PICTURE INFORMATION

BACKGROUND OF THE INVENTION

This invention relates to the photographic recording of images in a form adapted to subsequent reproduction by color television. The invention includes a method and apparatus for recording both still and moving pictures.

A method of recording electrical signals corresponding to a color television signal on panchromatically sensitized silver halide photographic film of the type normally used to produce black and white images may be described with reference to the accompanying FIG. 1.

It is now known that quality color video signals can be obtained from a photographic film in which luminance and color information are recorded in separate areas, such as illustrated in FIG. 1. In FIG. 1, the luminance component of the television signal is recorded on photographic film 1, for example, by an electron beam recorder (not shown) to produce successive exposed areas $L_1$, $L_2$, $L_3$ of luminance information. After normal processing, these exposed areas $L_1$, $L_2$, $L_3$, have the appearance of cinematographic recordings of the television picture. The film 1 carries also areas $C_1$, $C_2$, $C_3$, exposed by like means to record chrominance information corresponding to the luminance information recorded in areas $L_1$, $L_2$, $L_3$. It is understood that two superimposed signals are recorded in each area, $C_1$, $C_2$, $C_3$. The first of the signals is a chrominance carrier frequency signal, the amplitude and phase of which are modulated to indicate the saturation and hue respectively of the color in each part of the television picture. The second of these signals represents an unmodulated reference signal of half the frequency of the chrominance signal. Because they contain no luminance information, the areas $C_1$, $C_2$, $C_3$ of the processed film are not readily interpreted as pictures by visual inspection. When the recorded signal is to be reproduced, the film is passed through a flying-spot scanner adapted to scan corresponding points in the luminance and chrominance records simultaneously. A photocell receiving light passed by the luminance record produces an electrical signal according to known means and corresponding to the luminance component of the television signal. A second photocell receives light passing the chrominance record. The output of the second photocell is filtered to separate the chrominance carrier frequency and its sidebands from the reference signal at half the frequency of the chrominance carrier. The frequency of the reference signal is then doubled and the thus modified reference signal is used to decode the phase modulation of the chrominance carrier frequency. The decoded chrominance signal may thereafter be used to modulate the display system of a color television receiver according to known practice.

SUMMARY OF THE INVENTION

The present invention provides a method and apparatus for direct photographic recording of still or cinematographic records on photographic medium which may, after processing, be passed through the apparatus of the kind just described so that a color television receiver may be used to reproduce, in color, the scene recorded on the film. The method involves exposing simultaneously or in alternating sequence two areas of a suitable photographic film, such as panchromatically sensitized silver halide film. The first of these areas is exposed to a scene so that, after processing, this area of the film carries an image corresponding to a record of the luminance component of the picture subsequently to be reproduced. The second area of the film is exposed to the same scene but in this case the image is dissected into narrow bands of light of different colors, to form on the film a record of a color carrier signal modulated in amplitude and phase according to the saturation and hue of the color in generally corresponding bands in the original scene. This dissection is effected in a similar manner to the lenticular screen process of additive color cinematography (A. Klein, "Color Cinematography," Chapman and Hall Limited, 1939, pp. 196—205).

Recorded images of the type briefly described above are adapted to be analyzed by a flying-spot scanner so that electrical images may be generated in a form convenient for reproduction of the scenes on a color television receiver of know type. More specifically the invention may be carried out by exposing separate areas of a photosensitive material at the same time or in alternating sequence to (a) a scene by means of a normal camera exposure and (b) the same scene to an exposure wherein light from the said scene passes a banded filter and an objective lens, the said light passing also a lenticular screen close to and in front of the image plane of said objective lens, said lenticular screen comprising a plurality of juxtaposed part-cylindrical lenticulations, the axes of the lenticulations being arranged parallel to the bands of said banded filter, the position of said lenticular screen and the focal length of said lenticulations being arranged to form on the photosensitive material in the image plane of the said objective lens images of said banded filter. Preferably, the bands of the filter comprise elements of at least three qualities selectively transmitting or blocking the three parts of the visible spectrum, e.g., red, green and blue, the widths and numbers of the bands being arranged so that the lenticular screen projects upon the photosensitive material bands of colored light in a repeating pattern interrupted by unilluminated bands, said unilluminated bands being spaced at twice the pitch of illuminated bands of one color and then processing the exposed photosensitive material to produce the images.

The word blocking in the above method means that the filters, instead of selectively transmitting the three parts of the visible spectrum, selectively absorb or reflect the three primary colors red, green and blue, i.e. the three qualities of filter would appear cyan, magenta and yellow by transmitted light.

The preferred photosensitive material is panchromatically sensitized silver halide photographic film of the type used to produce black and white images. Such material after exposure can be developed and fixed or stabilized by methods known per se.

In a preferred embodiment of the method, the transmittances and color-selective properties of the filters are so chosen in relation to the spectral sensitivity of the photosensitive material that white light falling on the banded filter leads to substantially equal optical densities, after processing to produce the image, in parts of the image formed by adjacent colored bands of light.

According to another aspect of the present invention, there is provided a cinematographic camera wherein separate areas of a photosensitive film are imagewise exposed simultaneously to light from a common scene. In one embodiment, a beam splitter splits the light in two ways so that each of said separate areas receives approximately half the light, one of said areas being exposed by means of a normal camera exposure via an objective lens and the other area being subjected to an exposure wherein the light passes a banded filter (as described above) and an objective lens. Thereafter the light is directed to a lenticular screen close to and in front of the image plane of the objective lens. The lenticular screen is preferably in the form of a plurality of juxtaposed part-cylindrical lenticulations, the axes of the lenticulations being arranged parallel to the bands of said banded filter, with the position of the lenticular screen and the focal length of the lenticulations being arranged to form on the photosensitive material in the image plane of the objective lens images of said banded filter.

In another embodiment of the camera, areas along a length of photosensitive film are imagewise exposed in seriatim. To this end, the camera includes means for placing the lenticular screen in front of the film during every alternate exposure. During exposure, the lenticular screen is in the image plane of the objective lens and close to the film so that the lenticulations are, as before, parallel to the received color band images.

In one particular camera of the above type, the lenticular screen is incorporated in an apertured guide plate against which the film is pressed, said aperture being larger than the lenticular screen so that when the lenticular screen is withdrawn from the path of light reaching the film, the light reaches the film through that part of the aperture not covered by the lenticular screen, and the guide plate is restrained from movement in the axis of the objective lens but is movable in an axis normal to the axis of the objective lens between every exposure. In this manner, the lenticular screen lies in the path of the light falling on the film during every alternate exposure.

A particular advantage of a camera of the above type is that a lens of the continuously variable magnification type (zoom lens) can be fitted to the front of the camera.

BRIEF DESCRIPTION OF THE DRAWINGS

The following Figures will serve to illustrate the invention.

DESCRIPTION OF THE PREFERRED EMBODIMENTS

Figure 1:
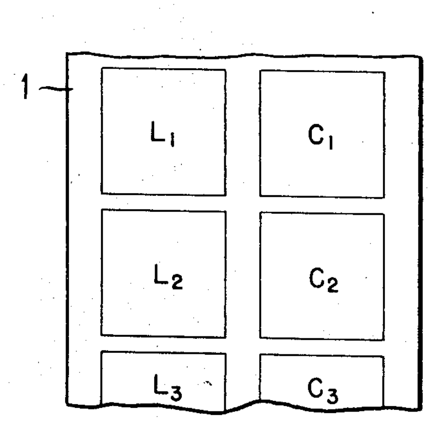
FIG. 1 is a view of a photosensitive surface having luminance information recorded on one series of frame areas and chrominance information recorded on an adjacent series of frame areas.
Figure 2:
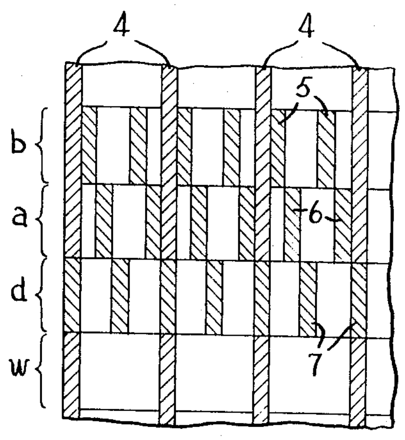
FIG. 2 is a magnified portion of a hypothetical recording in area $C_1$ of FIG. 1.

FIG. 2 represents on a greatly magnified scale part of a hypothetical recording in area $C_1$ of FIG. 1 resulting from exposure of that area according to the invention. In FIG. 2 the bars 4 passing vertically through the recorded area give rise to the reference frequency when scanned by a horizontally moving scanning spot. Bands 5 in FIG. 2 give rise to the chrominance carrier frequency signal in phase (relative to the reference frequency) corresponding to color of one quality (indicated as *b* in FIG. 2). Bands 6 give rise to a chrominance carrier displayed at 120 electrical degrees relative to that arising from bands 5. Consequently bands 6 produce a chrominance signal of phase corresponding to color of a different quality (indicated as *a* in FIG. 2). Bands 7 in FIG. 2 produce yet another phase of chrominance carrier and this corresponds to color of a third quality, *d* in FIG. 2.

Figure 3:
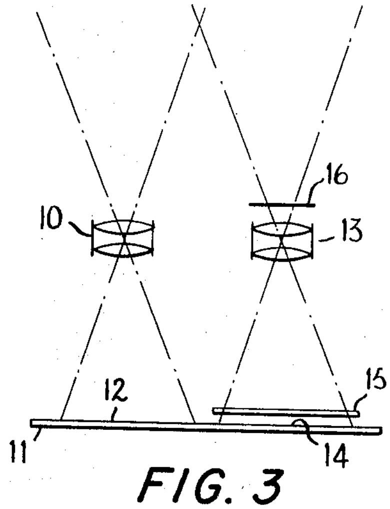
FIG. 3 is a diagrammatic representation of how photosensitive material is exposed to produce a pattern illustrated in FIG. 1.

FIG. 3 shows diagrammatically how the recording of the areas L, C can be carried out directly to arrive at the format just described in connection with FIG. 2. There, a lens 10 projects an image of the natural scene upon area 12 of photosensitive film 11. A second lens 13 produces a second image of the natural scene upon area 14 of the film 11. The photosensitive emulsion of the film 11 is on the side facing the lenses 10 and 13. A separate lenticular screen 15 is placed relative to film 11 to project upon it images of a banded filter 16. The direction of the bands in the filter 16 is arranged to lie parallel with the axis of the lenticulations in the screen 15. The lenticulations in screen 15 are arranged substantially at right angles to the direction of the lines along which area 14 will be scanned after the film 11 has been processed.

Since the film is not intended for reproduction by optical projection, it is in the case of the present invention not necessary that the lenticular screen shall be permanently registered with the photographic emulsion. It is therefore preferred that a separate lenticular screen be placed in front of that area of the film exposed to record the chrominance component of the picture information.

It will be appreciated that the embodiment shown in FIG. 3 suffers from the defect that the spatial separation of lenses 10 and 13 leads to spatial parallax in the images produced in areas 12 and 14 on the film. This objection may be reduced or eliminated by application of one of the known methods of producing upon film similar images free of parallax. Suitable methods are described, for example, in A. Klein ibid.

Figure 4:
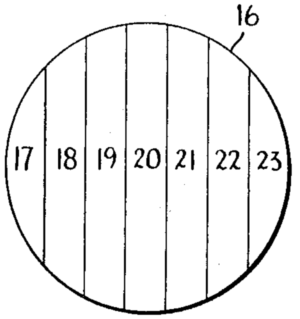
FIG. 4 is an enlarged plan view of the banded filter shown in FIG. 3.

FIG. 4 indicates a form of banded filter 16 suitable for use in the embodiment shown in FIG. 3. In FIG. 4, 17 and 23 are opaque areas. Area 18 and area 21 are of a color selective filter material of a first quality. Areas 19 and 22 are of color selective material of a second quality. Area 20 is of color selective material of a third quality. By way of example, it will be assumed that the said three qualities correspond to filters selectively transmitting the three primary colors red, green and blue. In an alternative form of the invention, however, the said three qualities could correspond to filters selectively absorbing or reflecting the three primary colors red, green and blue, i.e. the three qualities of filter would appear cyan, magenta and yellow by transmitted light.

Figure 5:
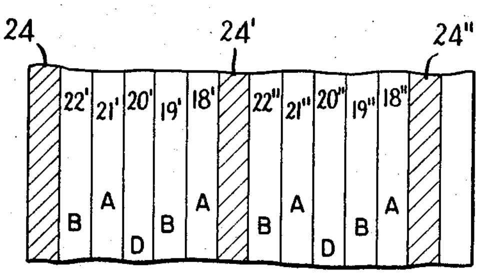
FIG. 5 is a diagrammatical view of an area of the chrominance record produced on the photosensitive material by use of the method of the invention.

The dimensions of the banded filter 16, the lenticular screen 15, and its separation from the photographic film 11, are so arranged, according to known principles, that images of the filter bands 18—33 are projected on the film lying behind each lenticulation of the screen 15. Between each group of images so produced there will lie an unilluminated band corresponding to the opaque elements 17 and 23 in the banded filter. These unilluminated areas are shown at 24, 24′ and 24″ in FIG. 5. The pitch of these unilluminated areas corresponds substantially to the pitch of the lenticulations of screen 15. After exposure and processing of the film, scanning produces a signal corresponding in wavelength to the pitch at which the unilluminated areas 24, 24′ and 24″ are spaced. This signal corresponds to the reference signal to be recorded in the system described in connection with FIG. 1. In FIG. 5 elements 18′—22′ represent images of filter bands 18—22 formed by one lenticulation of screen 15. Elements 18″—22″ represent images of filter bands 18—22 formed by the adjacent lenticulations. It will be noted that elements 18″, 21″, 18′, 21′ correspond to filter elements of the same color quality. In FIG. 5 this color quality is indicated by the letter A. It will be seen that the pitch of elements marked A is half that of the unexposed elements 24, 24′, 24″. Furthermore, elements 19″, 22″, 19′, 22′, correspond to filter elements of a second quality indicated in FIG. 5 by the letter B. The pitch of these elements is the same as that of elements of quality A, but their position is displaced by the width of one element. Elements 20″ and 20′ correspond to the color selective filter of the third quality, indicated in FIG. 5 by the letter D. Scanning of the area 14 of exposed and processed film 11 therefore gives rise also to a signal of wavelength corresponding to the pitch at which elements corresponding to quality A are distributed. The signal so developed in the scanning process can therefore be selected and interpreted as a chrominance carrier frequency signal, the amplitude of which indicates the saturation of color and the phase of which, relative to the phase of a reference signal, indicates the hue of the color.

Preferably, the light transmissive properties of the filter elements 18—22 are chosen relative to the spectral sensitivity of the emulsion of film 11 so that when a grey or white subject is recorded the corresponding areas of film 11 will, after processing, produce substantially equal optical densities in the areas 18′—22′ and 18″—22″.

It will be understood that in photographing an image upon area 14 of film 11, luminance information has been recorded in addition to chrominance. When the processed film is subsequently scanned, however, light passing area 14 may be caused to fall on a photocell, the signal from which is filtered so that the required reference and chrominance signals are separated by virtue of their known frequencies from the unwanted luminance signal recorded in the same area 14 of the film and producing signals over a much wider band.

Although means are known whereby identical images free of parallax errors may be formed upon adjacent areas of a film, the known methods suffer from the limitation that lenses must be used providing a distance between back element and film which is rather long compared with the diagonal of the image area. For many purposes this is a serious objection and the alternative embodiment now to be described removes this restriction entirely. By exposing the image sequentially rather than simultaneously, the alternative embodiment eliminates the need for a beam-splitting system and makes available more light for the exposure of each image.

Figures 6, 7, 8:
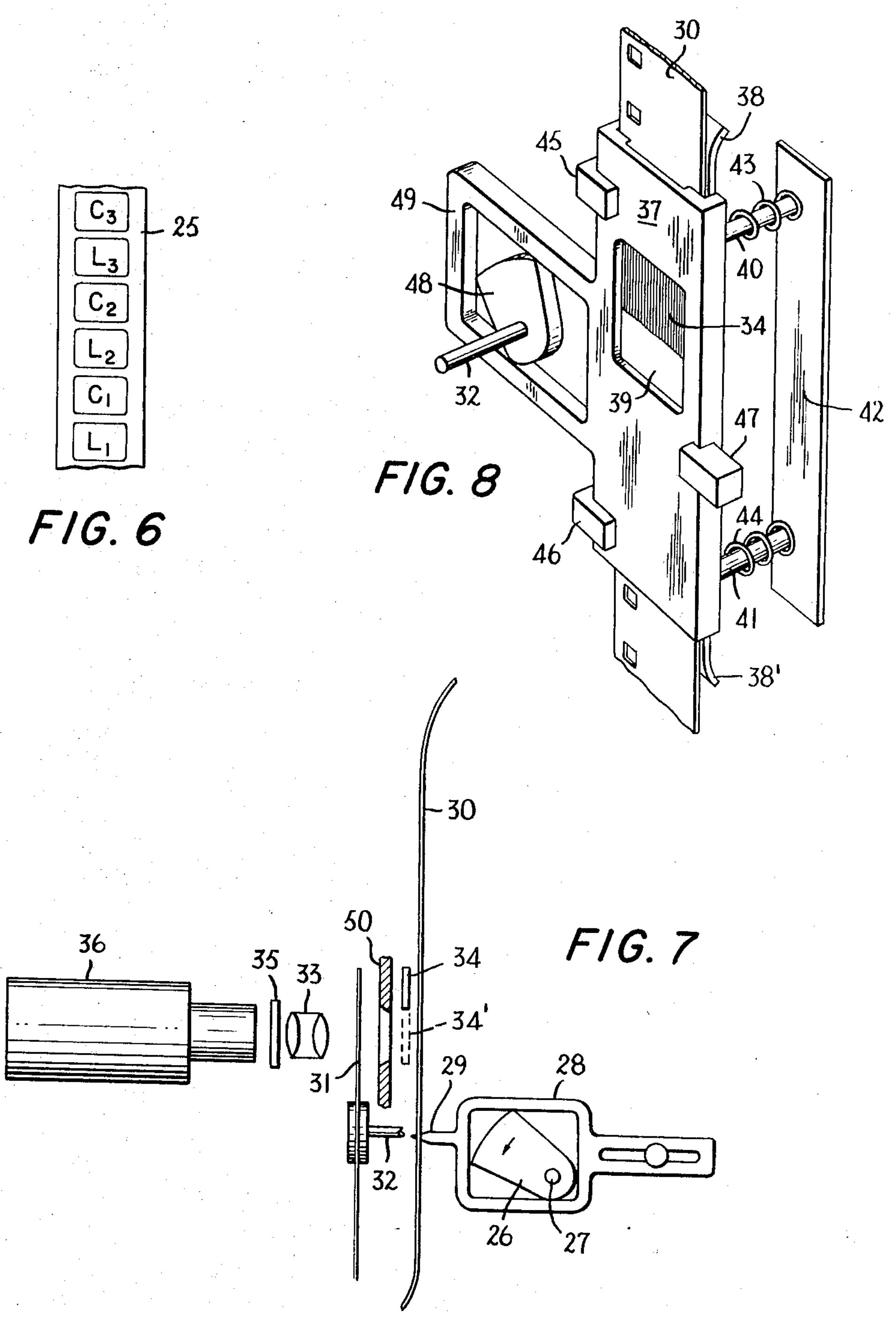
FIG. 6 represents diagrammatically an alternative arrangement of images on a length of photographic film.
FIG. 7 is a side elevation of part of a camera according to the present invention.
FIG. 8 is a perspective view of part of the same camera.

In FIG. 6 it will be seen that the areas $L_1$, $L_2$, etc. recording luminance are arranged in the same row on the film 25, and alternated with, the corresponding areas $C_1$, $C_2$, etc. recording chrominance information. Film exposed according to the image arrangement shown in FIG. 6 cannot be used directly in equipment designed to reproduce images from film according to FIG. 1, but it will be understood there is no great difficulty in providing the modifications necessary for this to be done.

A conventional cinematographic camera used for television newsreel purposes may operate at 25 pictures per second. It is well known that, in order to provide the illusion of smooth motion, the duration of each exposure should be close to one-half of the period of the operating cycle. The exposure interval in such a camera would therefore be close to 20 misec. Most of the remaining 20 misec. of the cycle is usually used to move the film. In this way a quiet and precise mechanism is readily provided.

Intermittent motions are commonly used in narrow-gauge cinematographic projectors in which the film movement occurs in no more than one-sixth of the operating cycle. It is proposed that such a mechanism should be used in the camera indicated in part in FIG. 7. In FIG. 7 a D-shaped cam 26 rotated by a shaft 27 moves a square frame 28 so that a claw 29 moves in a substantially rectangular path. Shaft 27 is driven by a motor (not shown) at 50 revolutions per second. Hence 50 times per second claw 29 engages with a perforation in the film 30 to advance it to a new position. The movement of the film occupies about 3.3 misec. Hence 16.7 misec. are available for exposure. This time is 83 percent of that provided in a conventional camera exposing 25 pictures per second. A shutter 31 rotates to interrupt exposure while the film is being moved. Shutter 31 is mounted on shaft 32 which is connected by gearing (not shown) to shaft 27.

It will now be understood that, when an objective lens 33 is arranged to form an image upon film 30, the camera in FIG. 7 will record 50 pictures per second. If only alternate pictures are considered (e.g. $L_1$, $L_2$, etc. in FIG. 6), it will be appreciated that they are exposed at the same rate as in a conventional camera and that they receive 83 percent of the exposure which such a camera would provide.

The camera in FIG. 7 includes also a lenticular screen 34 corresponding to the screen 15 in FIG. 3. Means are provided (not shown in FIG. 7) for moving screen 34 into the operative position 34′ immediately in front of the film being exposed. In this position, screen 34 forms upon the surface of film 30 multiple images of the banded filter 35 in front of the objective lens. When this occurs, chrominance information is recorded on the film as described in connection with FIGS. 3—5.

The lenticular screen 34 is moved in and out of operative position during consecutive film movements. That is to say, screen 34 moves to position 34′ during one film movement and, after exposure of one picture through screen 34, the screen is withdrawn from operative position during the following film movement. The next exposure is made without the screen in operative position and then it is again brought into position. In this way, film 30 is exposed to a sequence of images corresponding to the pattern $L_1$, $C_1$, $L_2$, $C_2$, etc. shown in FIG. 6.

For television and/or wide-angle photography, an attachment of known type may be placed in front of lens 33 and filter 35, as indicated by 36 in FIG. 7. In particular, it is convenient to use a variable magnification attachment, commonly known as a "zoom" lens attachment.

In FIG. 8 one method is indicated by which screen 34 may be moved cyclically in and out of operative position. In FIG. 8 the film 30 lies between a front guide plate 37 and a rear pressure plate 38, 38′. Guide plate 37 contains an aperture 39 of width equal to the width of image to be formed upon the film 30 and height more than twice the height of the image to be formed. The lenticular screen 34 is attached to guide plate 37 in the upper half of aperture 39. Pillars 40, 41 attached to the back of pressure plate 38, 38′, pass through holes in plate 42 attached to the camera body (not shown). Springs 43, 44 on pillars 40, 41, urge pressure plate 38, 38′, against the back of film 30 so that film 30 is held in a channel formed in front guide plate 37. Pressure from springs 43, 44, serves to urge guide plate 37 against guide blocks 45, 46, 47, attached to the camera body. In this way, the plane of the guide block 37 and, hence, of film 30 is defined relative to the image plane of lens 33. Guide block 47 may be spring-loaded to thrust on the edge of guide plate 37 so that plate 37 bears on the other edge against guide blocks 45, 46.

Shaft 32 is geared to rotate once for every two rotations of shaft 27. A D-shaped cam, 48, attached to shaft 32 acts against the upper and lower internal surfaces of a rectangular frame 49 at one side of front guide plate 37. Rotation of shaft 32 thus causes plate 37 to move rapidly between an upper and a lower position in each of which it dwells long enough to permit on exposure to be made through the opening of shutter 31 upon film 30 stationary in aperture 39. When plate 37 is in its upper position, film 30 is exposed without interposition of lenticular screen 34. When plate 37 is in its lower position, screen 34 lies between lens 33 and film 30, moreover, because screen 34 and film 30 are both positioned relative to plate 37, it is possible in this way to ensure that the screen 34 is positioned with the necessary small clearance from the film surface causing images of banded filter 35 to be formed upon film 30.

To define the area of film to be exposed at each opening of shutter 31, a fixed aperture plate 50 is placed in front of plate 37. The fixed aperture plate 50 is provided with a rectangular aperture substantially of the dimensions of the image to be formed upon the film. Plate 50 prevents light from passing through that half of aperture 39 which is, at any instant, moved out of operative position.

As shown in FIGS. 7 and 8, the camera operates with the following cycle of events:

a. Shutter 31 closes and claw 29 engages a perforation in film 30.
b. Cam 26 moves claw 29 down to advance film 30 by one image pitch. At the same time, cam 28 moves plate 37 down to bring lenticular screen 34 into operative positive. Friction between pressure plate 38 and the back of film 30 decelerates film 30 as claw 29 comes to the bottom of its stroke.
c. Shutter 31 opens to expose film 30 to light passing through lenticular screen 34. At the same time, cam 26 retracts claw 29 from engagement with the perforation and returns claw 29 to the top of its stroke.
d. Shutter 31 closes, and claw 29 engages a further perforation in film 30.
e. Cam 26 moves claw 29 down to advance film by one image pitch. At the same time, cam 48 moves plate 37 up to carry lenticular screen 34 out of operative position.
f. Shutter 31 opens to expose film 30 to light which has not passed through lenticular screen 34. At the same time, cam 26 retracts claw 29 and returns claw 29 to the top of its stroke.

Steps (a) to (f) are then repeated.

It will be noted that it is not in general necessary to provide means for withdrawing banded filter 35 from operative position during exposure of film 30 with lenticular screen 34 removed from operative position. In the absence of lenticular screen 34, banded filter 35 produces no patterning of the luminance record. It is, in fact, advantageous to leave filter 35 in position since, not only is this mechanically simpler than arranging its cyclic withdrawal, but also the film is thereby subjected to substantially the same degree of exposure whether or not screen 34 is interposed.

Although the invention has been described with reference to specific embodiments, it will be understood that many modifications and variations can be made without departing from the invention. Accordingly, all such modifications and variations are intended to fall within the scope of the appended claims.

I claim:

1. A method for recording original scenes on photosensitive material to produce images suitable for analysis by line scanning to generate electrical video signals convenient for reproduction of the scenes on a color television receiver, comprising:
exposing a first area of the material with an image of the luminance content of the scene;
converting an image of the same scene into a repeating pattern of at least two bands of colored light corresponding generally to at least two colors that may be present in corresponding patterns of the scene; and
exposing a separate area of the material with an image of the pattern of colored light bands.

2. A method as defined in claim 1 further comprising:
exposing the separate area with an image of a series of unilluminated bands parallel to the colored light bands and having a pitch different than the pitch of the pattern of colored light bands.

3. A method as defined in claim 2, in which:
the unilluminated bands interrupt the repeating pattern of colored light bands.

4. A method as defined in claim 1, in which:
the colored light bands are of respective intensities to produce records of equal optical densities on the material, when processed, in response to white light from the original scene.

5. A method as set forth in claim 4, in which:
the photographic material is panchromatically sensitized silver halide photographic film.

6. A method as defined in claim 1, in which:
each repeating group of colored light bands includes three primary color bands.

7. A cinematographic camera for photographically recording on photosensitive material to produce images suitable for analysis by television scanning techniques to generate electrical video signals convenient for reproduction on a color television receiver, comprising:
means for directing an image containing luminance information to expose a first area on the material;
color-selective means for converting an image of the same scene into a repeating pattern of at least two bands of colored light corresponding generally to at least two colors that may be present in a corresponding pattern of the original scene; and
lens means for focusing an image of the repeating pattern of colored light bands on the image plane of a separate area of the material.

8. A camera according to claim 7, in which:
the color-selective means comprises a banded color filter having at least two color-selective elements; and
the apparatus further comprises an objective lens in a common optical path with color filter between the original scene and the image plane of the material.

9. A camera as defined in claim 8, in which:
the lens means comprises a lenticular screen closely adjacent the image plane of the material and comprised of a plurality of juxtaposed part-cylindrical lenticulations parallel to the colored light band images.

10. A camera according to claim 9, in which:
the lenticular screen is located in the focal plane of the objective lens to focus each repeating pattern of colored light bands onto the separate area of the photosensitive material.

11. A camera as defined in claim 7, further comprising:
means for forming in the separate frame area substantially unilluminated bands parallel to the colored light bands and having a spatial pitch that is different than the spatial pitch between successive repeating colored light bands.

12. A camera according to claim 11, in which:
the last-named means comprises at least one opaque element associated with the color-selective means for periodically interrupting the pattern of colored light bands.

13. A camera according to claim 7, in which:
the color-selective means comprises adjacent color filter elements selectively transmitting at least three respective parts of the visible spectrum.

14. A cinematographic camera wherein areas along a length of photosensitive film are imagewise exposed in seriatim, comprising:
an objective lens;
a banded filter located closely adjacent the objective lens and including elements of at least three qualities selectively transmitting or blocking the three parts of the visible spectrum;
a lenticular screen disposed in the image plane of the lens and close to the film, the lenticular screen including a plurality of juxtaposed part-cylindrical lenticulations, the axes of the lenticulations being arranged parallel to the bands of said banded filter, the position of said lenticular screen and the focal length of said lenticulations being arranged to form on the photosensitive material in the image plane of the said objective lens images of said banded filter, the widths and numbers of the bands being arranged so that the lenticular screen projects upon the photosensitive material bands of colored light in a repeating pattern interrupted by unilluminated bands, said unilluminated bands being spaced at a pitch that is different than the pitch of illuminated bands of one color.

15. A camera according to claim 14, further comprising:
means for removing and placing the lenticular screen in front of the film during every alternate exposure of the film.

16. A cinematographic camera according to claim 15, further comprising:
an apertured guide plate against which the film is pressed and including in a part of the aperture thereof the lenticular screen, said plate being positioned to place the lenticular screen in the path of light from the filter during alternate exposures and movable to allow light from the scene being photographed during remaining exposures.

17. A camera according to claim 16, in which:
the guide plate is restrained from movement in the direction of the axis of the objective lens and is movable normal to such direction between every exposure to place the lenticular screen in the path of the light falling on the film during every alternate exposure.

18. A cinematographic camera according to claim 17, further comprising:
a zoom lens located in front of the color-selective means.